United States Patent [19]

Deutsch et al.

[11] Patent Number: 5,427,572
[45] Date of Patent: Jun. 27, 1995

[54] EXPANDABLE HARVESTER BASKET

[75] Inventors: Timothy A. Deutsch, Newton, Iowa; Wesley G. Carney, Waverly, Ill.; Jeffrey R. Fox, Minburn, Iowa

[73] Assignee: Deere & Company, Moline, Ill.

[21] Appl. No.: 212,405

[22] Filed: Mar. 14, 1994

[51] Int. Cl.6 .............................. A01F 12/60
[52] U.S. Cl. .................... 460/119; 56/16.6; 296/26
[58] Field of Search ............. 460/119, 23, 150; 56/28, 16.6

[56] References Cited

U.S. PATENT DOCUMENTS

| 3,412,532 | 11/1968 | Nickla . | |
| 3,674,073 | 7/1972 | Hendon | 150/7 |
| 4,553,378 | 11/1985 | Fachini et al. | 56/16.6 |
| 4,981,319 | 1/1991 | Gerzeny et al. | 296/26 |
| 4,996,831 | 3/1991 | Pearson et al. | 56/28 X |
| 5,151,064 | 9/1992 | Damman et al. | 460/23 |

Primary Examiner—Terry Lee Melius

[57] ABSTRACT

A cotton harvester basket structure includes a closure section connected to a rigid basket by a flexible material such as canvas above and rearwardly of the cotton compacting structure. As the basket is filled, the pressure from the cotton pushes the closure section up to provide only as much volume as necessary to accommodate the added volume of cotton after the basket fills to its normal capacity. Hinged side brackets help guide the lid section during the basket expansion and provide lid section stability, both in the lateral and fore-and-aft directions. After the cotton in the basket is unloaded, the lid automatically returns under the influence of gravity to its lowermost position.

21 Claims, 3 Drawing Sheets

EXPANDABLE HARVESTER BASKET

BACKGROUND OF THE INVENTION

1. Field of the Invention

The present invention relates generally to crop harvesters and, more specifically, to an expandable basket for a cotton harvester.

2. Related Art

Harvesters such as cotton pickers and strippers require a relatively large receptacle to receive a sufficient volume of harvested crop to avoid frequent dumps. Harvesting equipment has become more versatile, and some machines are capable of operating with different numbers of row units. A cotton basket may be sized correctly for one row unit configuration, but may be undersized for another configuration. When the basket is undersized and the operator tries to go one more round in the field before dumping, he often ends up with a full load at a location far removed from the dump site. The only alternative to a full load at an inconvenient location is unloading the basket before it is completely full. Such premature dumping wastes time and drastically reduces productivity.

On some older machines, baskets had hinged lids which could be lifted by the force of the cotton so that often the operator could make it to the end of the row. However, newer baskets are rigid on all sides and cannot expand when the basket is full.

BRIEF SUMMARY OF THE INVENTION

It is therefore an object of the present invention to provide an improved harvester basket structure which overcomes most or all of the abovementioned problems. It is a further object to provide such an improved basket structure which is relatively simple and inexpensive in construction.

It is a further object of the present invention to provide an improved basket for a harvester which improves harvester productivity and accommodates variations in harvester capacity. It is a further object to provide such a basket structure which can expand to allow an operator to finish the row he is currently harvesting before having to dump when the basket fills to normal capacity prior to the end of the row.

It is yet another object of the present invention to provide an improved harvester basket structure which expands easily beyond normal capacity. It is a further object to provide such a structure which returns to normal capacity automatically upon dumping of the load. It is yet another object to provide such a structure which has a substantially rigid and horizontal top when in the normal capacity position.

A cotton harvester basket structure constructed in accordance with the teachings of the present invention includes a closure or lid section connected to a rigid basket by a flexible material such as canvas. The lid section is supported above and partially rearwardly of the compacting structure and securely rests in a horizontal position on a mating support on top of the basket until normal capacity is exceeded. As a result, the transport dimensions of the basket are generally unchanged from that of a constant volume basket. As the basket approaches the filled condition, the pressure from the compacted cotton pushes the lid upwardly against the bias of the lid weight to provide only as much volume as necessary to accommodate the added cotton after the basket fills to its normal capacity. Additional volume is limited only by the length of the material connecting the basket and the lid. Hinged side control arms help guide the lid section during the basket expansion. The arms stabilize the lid section, both in the lateral and fore-and-aft directions, and help assure that the lid structure returns automatically under the influence of gravity to the proper support position on top of the basket. Cylinders or other power means for changing basket capacity are eliminated. The extra volume of cotton is supported near the rear of the harvester for better weight distribution.

These and other objects, features and advantages of the present invention will become apparent to one skilled in the art upon reading the following detailed description in view of the drawings.

DETAILED DESCRIPTION OF THE DRAWINGS

Figure 1:
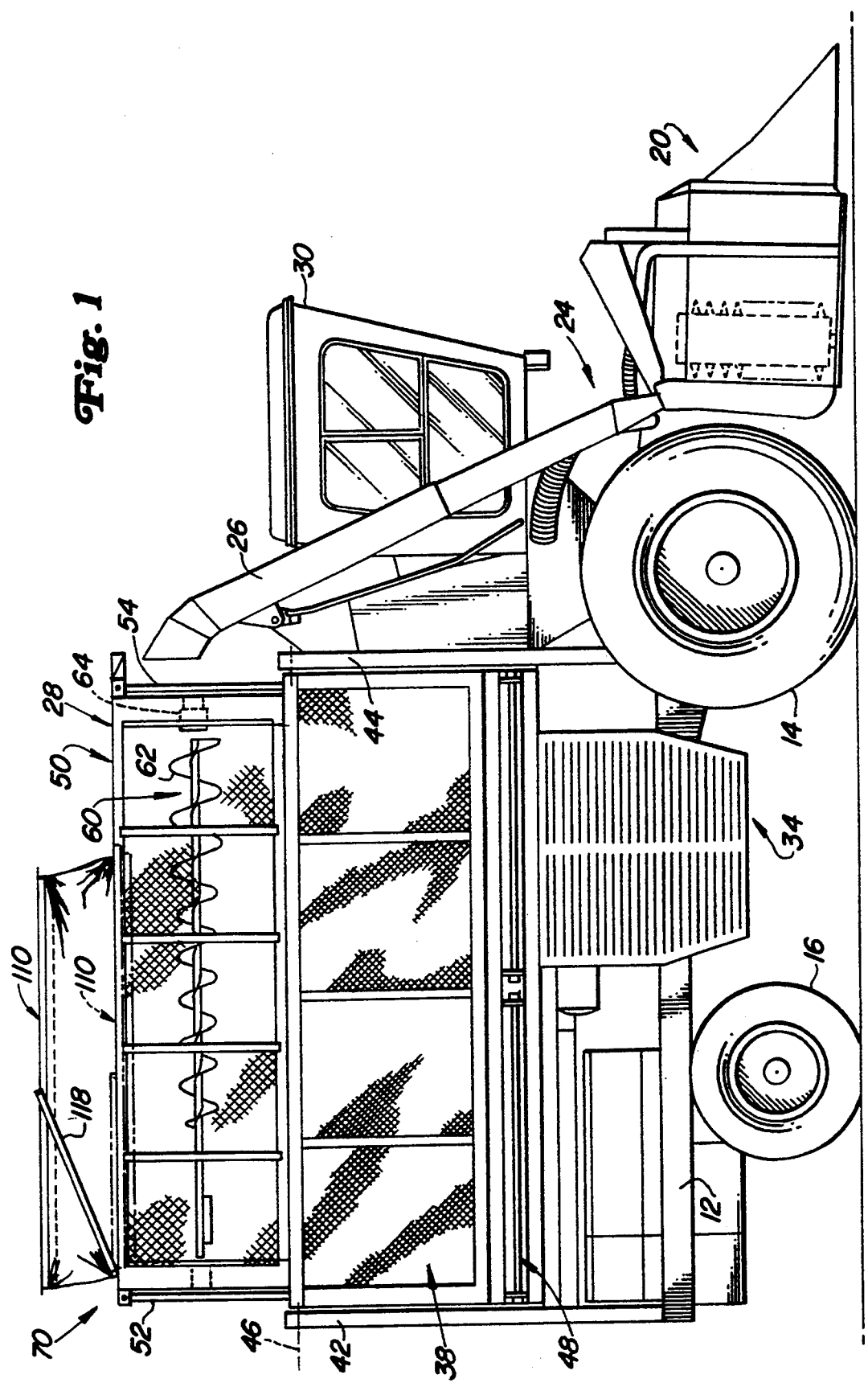
FIG. 1 is a side view of a cotton harvester with basket expansion structure.

Referring now to FIG. 1, therein is shown a cotton harvester 10 having a main frame 12 supported for forward movement over the ground by forward drive wheels 14 and rear steerable wheels 16. A plurality of row units 20 are transversely spaced at the forward end of the frame 12 for receiving rows of cotton plants and removing the cotton therefrom. The removed cotton is conveyed pneumatically by a conventional duct system indicated generally at 24 which includes ducts 26 extending upwardly and rearwardly from the row units to the upper forward end of a cotton basket or receptacle 28. The basket 28 is supported on the frame 12 behind a cab 30 and above harvester engine and drive structure, indicated generally at 34 in FIG. 1.

The basket 28 includes a generally rectangular box-shaped lower portion 38 pivotally connected to the frame 12 by masts 42 and 44 for rocking about a fore-and-aft extending axis 46 located near the top of the lower portion. A floor conveyor system 48 and a dump side drop-down door (not shown) enable the basket 28 to be unloaded after the dump side of the basket is rocked upwardly about the axis 46. The lower portion 38 of the basket 28 is substantially rigid.

The basket 28 also includes a downwardly opening, box-like top section 50 having a length and a width slightly less than that of the lower portion 38 and telescopingly received by the lower portion. Front and rear telescoping cylinders 52 and 54 connected between the frame 12 and the central upper portions of the ends of the top section 50 move the top section 50 relative to the bottom section between a raised field-working position (shown) and a lowered transport position. Locking structure (not shown) secures the top section 50 of the basket in the raised position, wherein a preselected normal operating basket capacity, preferably about 1200 cubic feet, is provided for receiving harvested cotton.

The basket section 50 is substantially rigid and supports cotton compacting structure 60, shown in FIG. 1 as a plurality of transversely spaced augers 62 with parallel fore-and-aft extending axes of rotation. A hydraulic drive 64 rotates the augers 62 to move the cotton a selected direction in the basket 28 and compact the cotton for better productivity. The flighting on the augers 62 terminates forwardly of the rear of the basket 28. Basket expansion structure, indicated generally at 70, is located on the basket 28 and is offset toward the rear of the basket and in the selected compacting direction from the compacting structure 60. The structure 70, described in detail below, expands as necessary to increase cotton capacity beyond the preselected normal operating capacity and supports the extra cotton near the rear of the harvester 10.

The basket section 50 includes a section frame 74 having transversely spaced fore-and-aft extending upper beams 76 and front and rear connecting beams 78 and 80. The frame 74 extends downwardly from the beams 76, 78 and 80 to a lower frame member 82 which is received within the lower portion 38. The forward side of the basket section 50 opens towards the outlets of the ducts 26 to receive rearwardly propelled cotton. Mesh or expanded metal panels 84 are fixed to the rear and sides of the frame 74 to close the rear and sides to cotton while permitting smaller trash and dirt to exit the basket containment area. An intermediate connecting beam 88 extends between the beams 76 rearwardly of and parallel to the beam 78, and grate structure 92 closes the top of the basket between the beams 78 and 88 to cotton conveyed in from the ducts 26.

Figure 2:
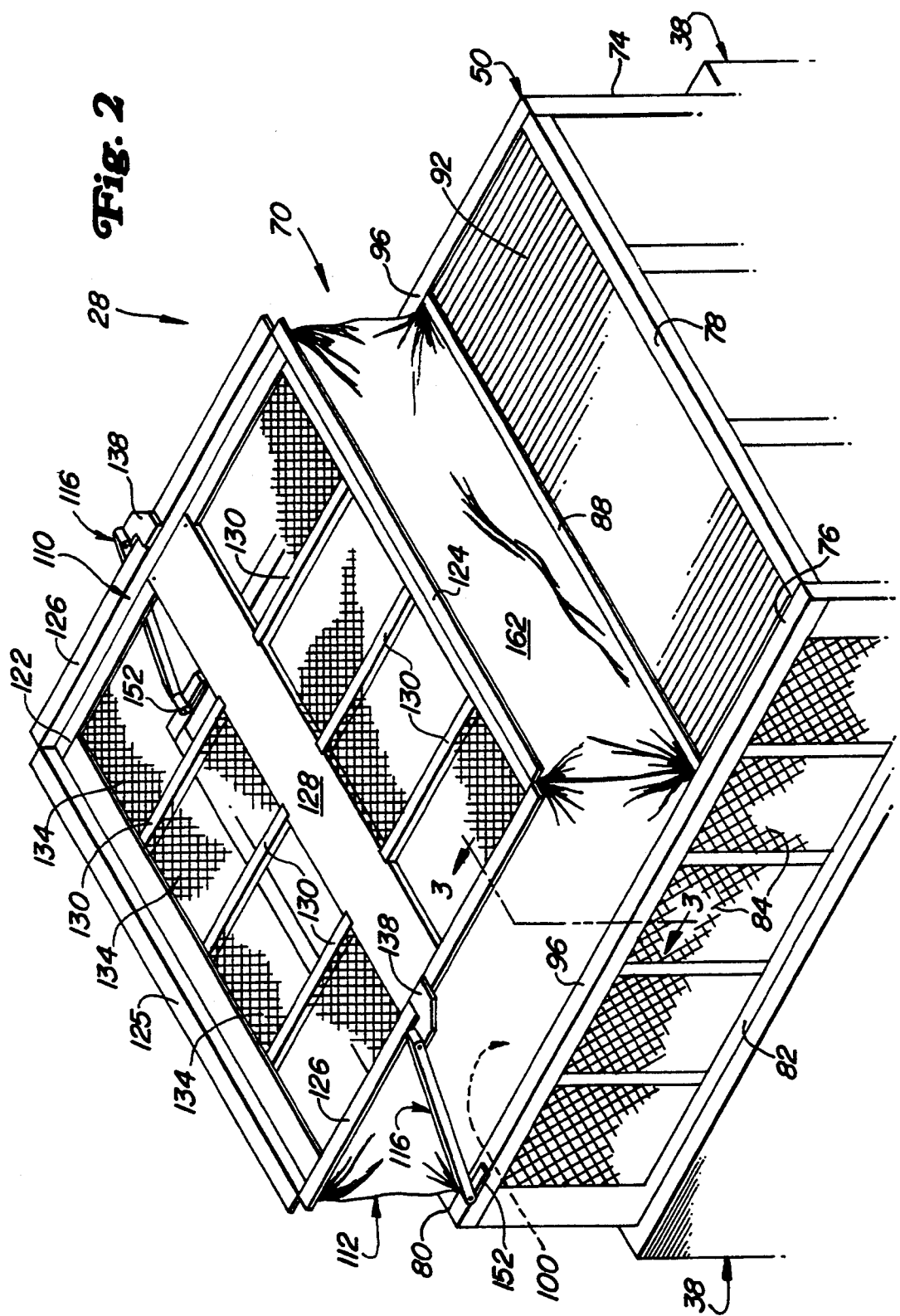
FIG. 2 is a perspective view of the top of the basket of FIG. 1 with the expansion structure in the fully expanded position.
Figure 3:
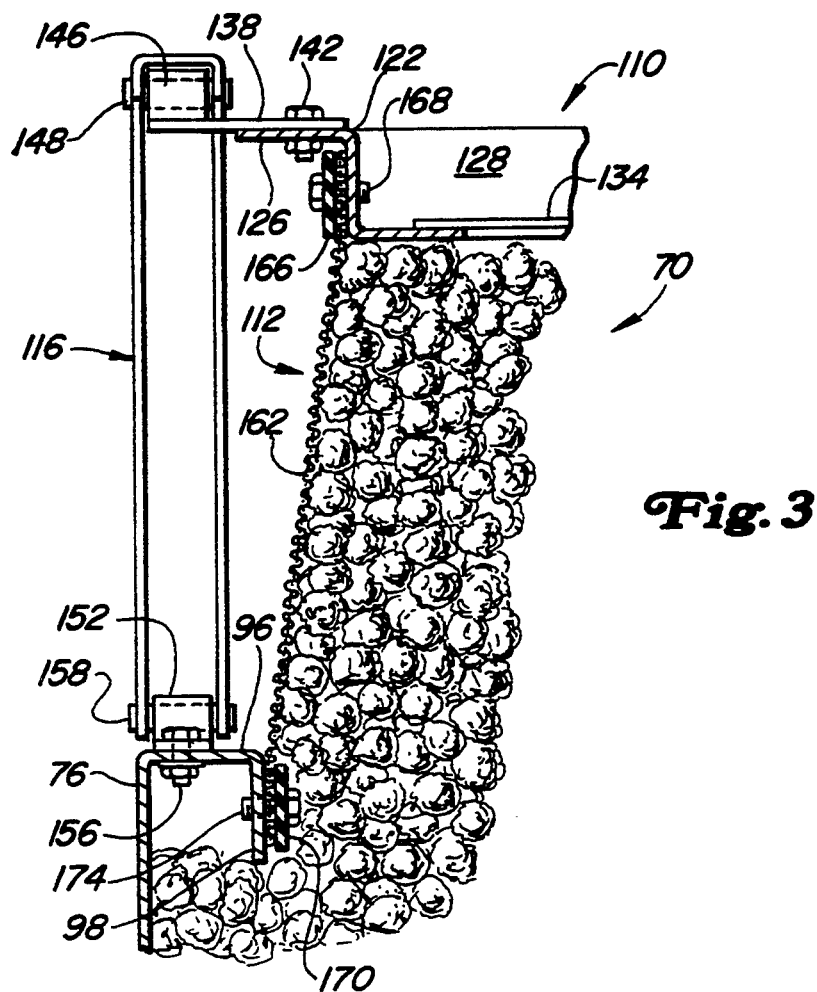
FIG. 3 is a view taken essentially along lines 3—3 of FIG. 2.
Figure 4:
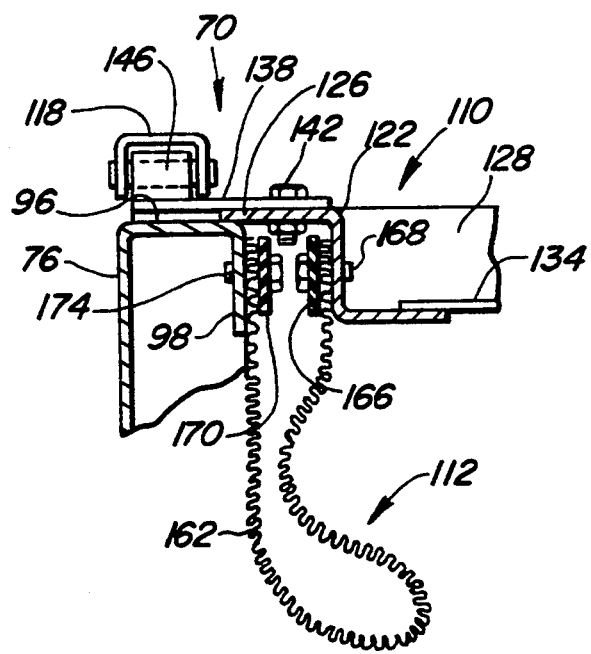
FIG. 4 is a view similar to that shown in FIG. 3 but with the expansion structure collapsed to the normal operating position.

As best seen in FIGS. 3 and 4, the beams 76 are channel-shaped with an upper horizontal surface 96 and an inner depending flange 98. The surface 96 lies generally in the same plane as the tops of the beams 78, 80 and 88. A horizontal opening 100 (FIG. 2) is defined in the top of the basket section 50 between the beams 76, 80 and 88, which is closed to cotton by the expansion structure 70.

The expansion structure 70 includes a frame or lid section 110 which conforms to the shape of the opening 100 and provides a closure for the opening in normal operation. The structure 70 also includes a flexible material 112 having an upper boundary fixed to the periphery of the lid section 110 and a lower boundary fixed to the periphery of the opening 100 and permitting the lid section 110 to move upwardly from a normal operating position (FIG. 4 and broken lines of FIG. 1) supported on the surface 96, to various increased volume raised positions up to a maximum volume position (FIGS. 2 and 3) wherein the flexible material is taut and the lid section is offset a maximum distance from the opening 100. Left- and right-hand control arms 116 are pivotally connected to the upper surfaces of the beams 76 and to the lid section 110 to stabilize and guide the lid section 110 as it moves vertically relative to the basket section 50.

The lid section 110 includes a rectangular metal frame 122 having front and rear transversely extending angles 124 and 125, and side angles 126 extending in the fore-and-aft direction between the angles 124 and 125. A central transverse beam 128 and a series of fore-and-aft members 130 support mesh panels 134 which contain the cotton below the frame 122. The weight of the frame 122 biases the lid section 110 towards the lowermost position wherein the horizontal flanges of the angles 124–126 rest on the upper surfaces 96 (FIG. 4) and on the beams 80 and 88.

Brackets 138 are fixed by bolts 142 to the tops of the angles 126 adjacent the transverse beam 128. The brackets extend outwardly and rearwardly to widened pivot bushings 146 (FIGS. 3 and 4). Each control arm 116 is channel-shaped and has an upper end which opens downwardly around the bushing 146 and is pivotally connected thereto by a pin 148 having a transverse axis. The control arm 116 extends a substantial distance rearwardly to a similar pivotal connection with a rear bracket 152 fixed by bolts 156 to the top surface 96 at the rear of the beam 76. A pin 158 pivotally connects the arm 116 to the bracket 152 for rocking about an axis parallel to the pin 148.

The flexible material 112, which preferably is a canvas or tarp 162 or similar material having good strength and flexibility, extends completely around the opening 100 and with the lid section 110 defines a closed expandable area that increases as needed the normal capacity of the basket 28 by up to at least 10%. The upper boundary of the canvas 162 is secured to belting 166, and self-tapping screws 168 which extend through the belting and upper boundary secure the canvas 162 to the vertical flange of the frame 122. Belting 170 is secured to the lower boundary of the canvas 162, and self-tapping screws 174 connect the lower boundary of the canvas to the flange 98 and to corresponding flanges on the beams 80 and 88.

In operation as the basket 28 fills, the cotton delivered from the outlets of the ducts 26 is compressed and moved rearwardly by the compacting structure 60. The weight of the lid structure 110 maintains the expansion structure 70 in the closed or collapsed position (broken lines of FIG. 1) so that the top of the basket 28 lies generally in a horizontal plane level with the top surfaces of the beams 76–80 with the flexible material 112 folded back on itself as shown in FIG. 4. As the basket fills towards normal capacity and cotton is compressed against the downward bias lid section 110, the compressed cotton moves lid section upwardly against the bias to expand the capacity of the basket as necessary to accommodate additional cotton. The control arms 116 stabilize the lid section 110 as it moves upwardly from the normal resting position on the beams 76, 80 and 90 and prevent unwanted fore-and-aft and side-to-side movement. The lid section 110 can move upwardly to a limit position wherein the flexible material 112 is taut (FIG. 3) between the basket frame and the lid section and maximum expansion capacity is reached. As shown, the lid section 110 in the limit positions is horizontal, although the section can tilt about the transverse axis of the pins 148 during chamber expansion to accommodate different cotton distributions within the chamber. For example, the rear of the expansion structure 70 normally fills first to assure that full basket capacity is utilized, and the ability of the section 110 to tilt allows the rear of the section to raise first and facilitate this necessary rear filling. The downward bias caused by the weight of the lid section 110 helps assure that the cotton is compressed within the expansion chamber 70 and causes the lid section to return automatically to the normal position on top of the basket frame as the cotton is unloaded.

Having described the preferred embodiment, it will become apparent that various modifications can be made without departing from the scope of the invention as defined in the accompanying claims.

We claim:

1. In a cotton harvester basket structure including a receptacle having a lower portion extending upwardly to a top section for containing a preselected volume of harvested cotton, compacting structure for urging the cotton in a preselected direction in the basket, the top section including an opening, an expandable basket section for containing a volume of harvested cotton in addition to the preselected volume, the basket section comprising:

flexible material connected to the top section adjacent the opening;

a lid section connected to the flexible material and movable between a normal operating position over the opening for closing the opening to cotton when the receptacle contains the preselected volume or less of cotton, and an increased volume position wherein the lid section is raised relative to the opening as the volume of harvested cotton increases beyond the preselected volume, wherein in the increased volume position, the lid section and flexible material define a supplementary chamber for containing the volume of harvested cotton in addition to the preselected volume.

2. The invention as set forth in claim 1 wherein the lid section comprises a flat metal structure conforming generally to the shape of the opening and covering the opening when the receptacle contains the preselected volume or less of cotton.

3. The invention as set forth in claim 1 including bracket structure connected between the top section and the lid section for guiding the lid section between the normal operating position and the increased volume position.

4. The invention as set forth in claim 2 including bracket structure connected between the top section and the lid section for guiding the lid section between the normal operating position and the increased volume position.

5. The invention as set forth in claim 1 wherein the flexible material includes a bottom boundary fixed to the top section and an upper boundary fixed to the lid section, the lid section being substantially heavier than the flexible material and providing downward bias resisting upward movement of the additional volume of harvested material.

6. The invention as set forth in claim 1 wherein the lid section comprises a horizontal rectangular metal frame for containing the additional volume of cotton therebelow, and wherein the opening includes a periphery generally conforming to the shape of the metal frame and supporting the metal frame when the lid section is in the normal operating position.

7. The invention as set forth in claim 6 including an arm member having a first end pivotally connected to the top section and an opposite end pivotally connected to the metal frame for rocking about parallel axes and lending stability to the lid section when the lid section is in the increased volume position.

8. The invention as set forth in claim 5 wherein the upper and lower boundaries of the flexible material lie adjacent each other when the lid section is in the normal operating position.

9. The invention as set forth in claim 1 wherein the opening is offset in the preselected direction from the compacting structure, and wherein the compacting structure urges the cotton against the lid section to raise the lid section when the volume of cotton increases beyond the preselected volume.

10. In a cotton harvester basket structure including a receptacle having a lower portion extending upwardly to a top section for containing a preselected volume of harvested cotton, compacting structure for compacting the cotton in the basket, expansion structure for containing a volume of cotton in addition to the preselected volume, including:

an opening located in the receptacle;

a movable lid section;

means for supporting the lid section relative to the receptacle for movement between a first portion generally closing the opening wherein the receptacle has a capacity equal to the preselected volume, and offset positions wherein the lid section is offset from the opening;

connecting material extending between the lid section and the receptacle, the connecting material defining with the lid section, when the lid structure is offset, an expansion chamber for increasing the capacity of the receptacle; and wherein as the volume of harvested cotton approaches the preselected volume, the lid section is moved towards the offset positions in response to entry of cotton into the receptacle.

11. The invention as set forth in claim 10 wherein the means for supporting the lid section relative to the receptacle includes mating support members connected to the lid section and the receptacle, respectively, for retaining the lid structure in alignment with the opening when the lid section is in the first position.

12. The invention as set forth in claim 10 wherein the lid section is substantially horizontal, and further including support bracket structure connected between the lid section and the receptacle for stabilizing the lid structure as the lid structure moves to and from the first position.

13. The invention as set forth in claim 10 wherein the connecting material comprises a flexible canvas.

14. The invention as set forth in claim 10 wherein the connecting material is flexible and extends substantially around the opening.

15. The invention as set forth in claim 14 wherein the flexible material has an upper boundary connected to the lid section and a lower boundary connected to the receptacle and generally encompassing the opening.

16. In a cotton harvester basket structure including a fore-and-aft extending receptacle having a receptacle frame and panel structure generally closing the frame for receiving and containing a preselected volume of harvested cotton, compacting structure for compacting the cotton in the receptacle, expansion structure for containing a volume of cotton in addition to the preselected volume, including:

a receptacle frame section defining an opening in the basket structure;

expandable closure structure connected to the basket frame adjacent the opening, the closure structure having a normally collapsed position when the receptacle is receiving cotton wherein the opening in the basket frame section is substantially closed so that the preselected volume is contained, the closure structure movable to an expanded position to thereby define an expansion chamber adjacent the opening for receiving the additional volume of cotton when the volume of harvested cotton approaches the preselected volume to accommodate the additional volume of cotton.

17. The invention as set forth in claim 16 wherein the closure structure, in the collapsed position, defines a generally planar surface with the basket frame section.

18. The invention as set forth in claim 16 wherein the closure structure is offset toward the rear of the receptacle so that the center of gravity of the receptacle with the additional volume of cotton is shifted rearwardly compared to that of the receptacle which contains only the preselected volume of cotton.

19. The invention as set forth in claim 16 wherein the closure structure includes a rigid section having a shape conforming to the shape of the opening and biased to a position over the opening when the closure structure is in the collapsed position.

20. The invention as set forth in claim 19 wherein the closure structure further includes a flexible material connected between the rigid section and a periphery of the opening, the flexible material facilitating movement of the rigid section away from the opening as the cotton is compacted in the receptacle against the closure structure.

21. In a cotton harvester basket structure including a fore-and-aft extending receptacle having a receptacle frame and panel structure generally closing the frame for containing a preselected volume of harvested cotton, compacting structure for compacting the cotton in the receptacle, expansion structure for containing a volume of cotton in addition to the preselected volume, including:
 a receptacle frame section defining an opening in the basket structure;
 expandable closure structure connected to the basket frame adjacent the opening, the closure structure having a collapsed position wherein the opening in the basket frame section is substantially closed so that the preselected volume is contained and an expanded position wherein the closure structure defines an expansion chamber adjacent the opening for receiving the additional volume of cotton; and
 wherein the closure structure is offset toward the rear of the receptacle so that the center of gravity of the receptacle with the additional volume of cotton is shifted rearwardly compared to that of the receptacle which contains only the preselected volume of cotton.

\* \* \* \* \*